March 31, 1936.  C. A. BARRETT  2,036,011
AIRCRAFT
Filed May 14, 1934

Inventor:
Carl A. Barrett
By Rummler Rummler & Woodworth
attys.

Witnesses:

Patented Mar. 31, 1936

2,036,011

UNITED STATES PATENT OFFICE 2,036,011

AIRCRAFT

Carl A. Barrett, Chicago, Ill.

Application May 14, 1934, Serial No. 725,485

2 Claims. (Cl. 244—14)

This invention relates to aircraft of the heavier-than-air type; and especially to wing design. The main objects of the invention are to provide an airplane of improved form, particular reference being had to airfoils and attachment thereof to the body or fuselage of the craft; to provide a glide wing structure adapted for overhead mounting and rotary operation, so as to combine both gliding effect and gyroscopic stabilization; to provide and mount such a wing so as to better enable landing at low speed on a small field; and to provide, on such a gyroscopic wing, air engaging means adapted to cause automatic rotation of the wing, and corresponding gyroscopic action, as the craft moves through the air.

This invention is illustrated by the accompanying drawing in which—

Figure 1:
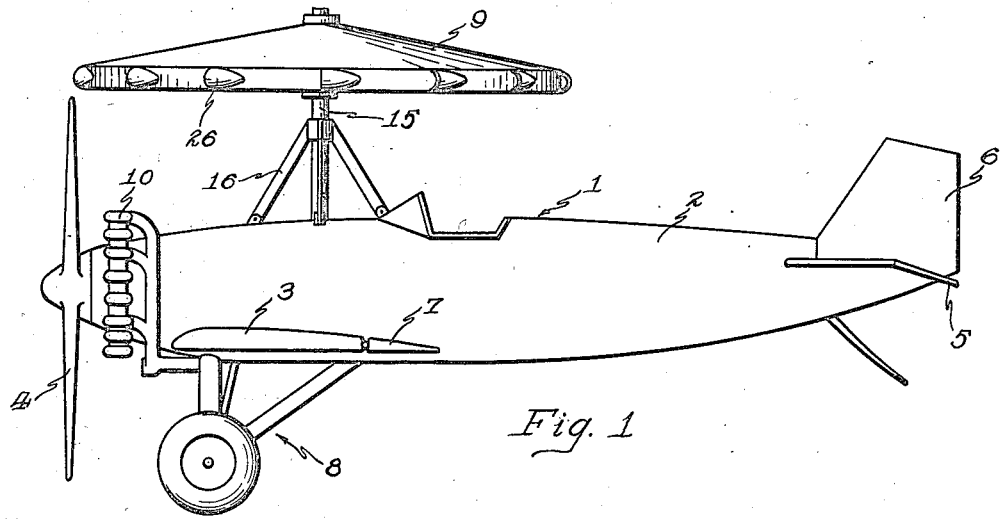
Figure 1 is a side elevation of the craft.

The airplane 1 comprises a fuselage 2 mainly of usual construction, side wings 3 preferably of short design, a horizontally axled propeller 4, horizontal tail rudder or elevator 5, a vertical tail rudder 6, ailerons 7 on the wings as usual, landing gear 8, a horizontal rotary airfoil 9, and an engine 10 to furnish power.

The wing or airfoil 9 is mounted rotatably on the upper end of a shaft 15 fixed and braced as at 16 to the fuselage. The airfoil is held in place between the stop means 17 and 18 on said shaft.

Figure 2:
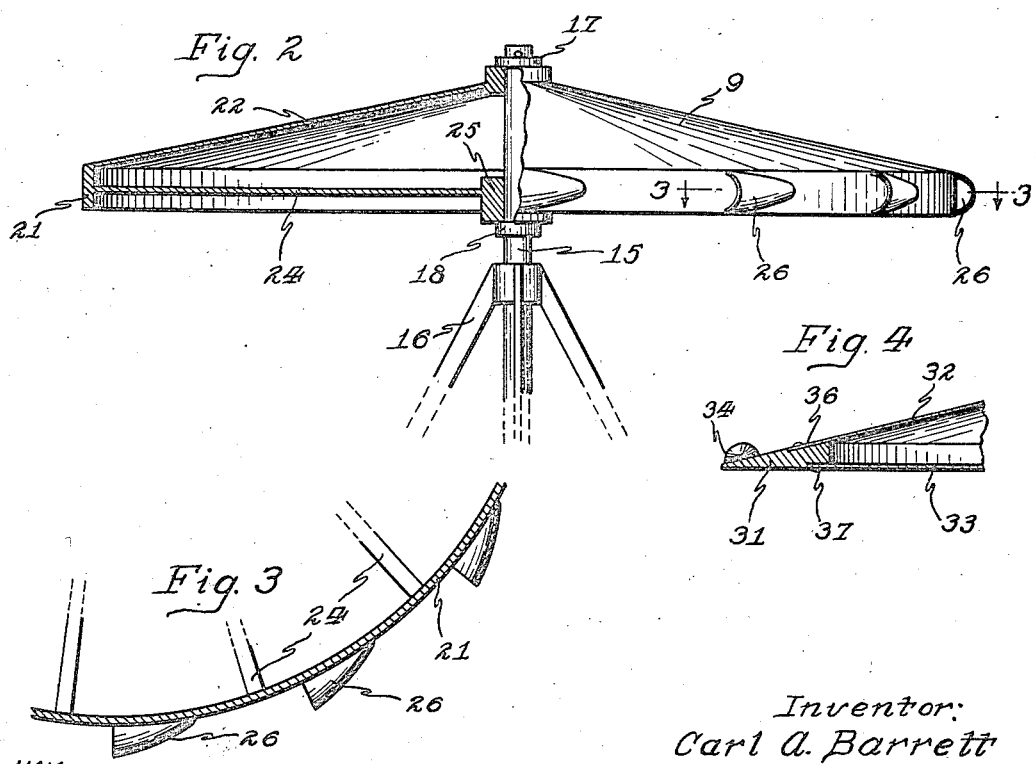
Fig. 2 is an enlarged wing detail, with the left side in vertical, axial section.

The said airfoil 9 is discoidal and comprises a metal rigid ring 21, preferably of steel, to serve as a frame and to give gyroscopic mass, in combination with a downwardly concave conoidal web 22 secured thereto, a series of peripherally radial braces 24 extending outward from a central hub 25 to said ring, and a series of air engaging pockets or vanes 26 disposed about the periphery of said ring and all facing in the same direction peripherally. When the craft advances through the air the vanes only on one side engage the air operatively, and this induces rotation of the wing, with the corresponding desired gyroscopic effect. As viewed downwardly on Figs. 1 and 2, the rotation is counterclockwise.

Such a wing, mounted as herein set forth, has a stabilizing effect, both gyroscopically and aeronautically, the latter including parachutic retarding effect in landing, especially on a small field.

It is to be understood that some of the details set forth may be altered or omitted without departing from the spirit of the invention as defined by the following claims.

Figure 4:
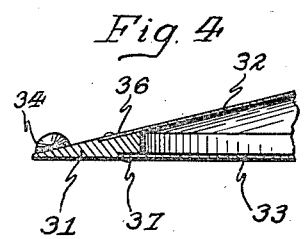
Fig. 4 is a similar section through a modified form of wing.
Figure 3:
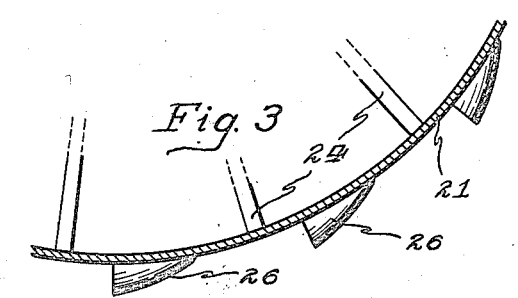
Fig. 3 is a horizontal section through the rim of the wing, or airfoil, on the line 3—3 of Fig. 2.

A simple modification of rotary wing construction is illustrated for instance in Fig. 4, wherein the gyroscopic frame ring 31 is substantially planar in design with a relatively sharp outer edge, and the body of the wing includes an upper thin conoidal web member 32, and a flat thin lower web member 33. In this instance the cup-like vanes are secured to the upper outer edge of the ring as at 34, and said web members are secured to said ring as at 36 and 37 respectively.

I claim:

1. An airplane having a rotary discoidal wing of upwardly convex design the pivotal axis of which is nearly vertical when the craft is in its normal flying position, said wing having circumferentially arranged bucket-vanes on its upwardly facing top or roof side all facing in the same peripheral direction to engage the air and cause rotation of the wing in flight, said airplane together with its said wing being inclined at times sufficiently to give substantial lifting effect as said wing skims edgewise through the air.

2. In an aircraft, a sharp-edged gyroscopic discoidal automatically rotary wing of upwardly convex design mounted to glide edgewise through the air, and having cupped vanes on the upwardly facing top side of its outer edge part all facing in the same peripheral direction to automotively engage the air for rotating said wing.

CARL A. BARRETT.